United States Patent [19]

Güttinger

[11] 3,877,074

[45] Apr. 8, 1975

[54] MINIATURE TAPE RECORDING AND REPRODUCING APPARATUS WITH ONE FINGER CONTROLLED SWITCHING ARRANGEMENT

[75] Inventor: Alois Güttinger, Allershausen, Germany

[73] Assignee: Compur-Werk Gesellschaft mit beschrankter Haftung & Co., Munich, Germany

[22] Filed: Apr. 12, 1973

[21] Appl. No.: 350,471

Related U.S. Application Data

[63] Continuation-in-part of Ser. No. 345,658, March 28, 1973.

[30] Foreign Application Priority Data

| | | |
|---|---|---|
| Apr. 14, 1972 | Germany | 2218083 |
| Apr. 21, 1972 | Germany | 2219578 |
| July 12, 1972 | Germany | 2234299 |
| Jan. 22, 1973 | Germany | 2302954 |

[52] U.S. Cl. .................... 360/96; 360/62; 360/137; 242/201

[51] Int. Cl. .................... G11b 15/02; G11b 15/32

[58] Field of Search .......... 179/100, 10 R; 274/4 C; 360/73, 74, 92, 96, 62, 66, 90, 93, 137

[56] References Cited

UNITED STATES PATENTS

| | | | |
|---|---|---|---|
| 2,951,653 | 9/1960 | Haenel | 242/201 |
| 2,989,261 | 6/1961 | Gillette et al. | 242/204 |
| 3,547,446 | 12/1970 | Kern | 274/4 C |
| 3,550,983 | 12/1970 | Probst | 274/4 C |
| 3,591,186 | 7/1971 | Murata | 274/4 C |
| 3,724,859 | 4/1973 | Kobler et al. | 242/208 |
| 3,785,586 | 1/1974 | Engert et al. | 242/201 |

*Primary Examiner*—Terrell W. Fears
*Assistant Examiner*—Stewart Levy
*Attorney, Agent, or Firm*—Stonebraker & Shepard

[57] ABSTRACT

A tape recorder having a compact switching control arrangement which can be readily operated by one finger (preferably the thumb) of one hand while holding the apparatus in the same hand, to move the switching control to any operative position such as the respective positions for recording, for rewinding, for listening to what has been recorded, and preferably also for rapid advance to find a desired portion of the previous recording. This is accomplished by longitudinal movement in one direction or the other of a control slide, the manually accessible portion of which has safeguard latch means to prevent accidental undesired movement. During the slow advance of the tape while recording or while listening to a previous recording, when any extraneous noise is highly undesirable, the drive is through a friction drive which is very quiet. During the rapid rewind, when a higher level of noise can be tolerated, the drive is through toothed gear wheels. Preferably the apparatus includes a rapid forward drive for bringing the tape quickly to a position for listening to a desired portion of a previous recording, and the rapid forward drive is also through toothed gears rather than through a friction drive.

22 Claims, 10 Drawing Figures

MINIATURE TAPE RECORDING AND REPRODUCING APPARATUS WITH ONE FINGER CONTROLLED SWITCHING ARRANGEMENT

CROSS REFERENCE TO RELATED APPLICATION

This application is a continuation-in-part of application Ser. No. 345,658, filed Mar. 28, 1973.

BACKGROUND OF THE INVENTION

This invention relates to sound recording and reproducing apparatus for recording speech, music, or other sounds on a suitable recording medium such as magnetic tape, and for reproducing the recorded sounds from the recording on the tape. various forms of such apparatus are well known in the art, and are usually referred to broadly as tape recorders.

The present invention relates especially but not exclusively to small apparatus housed in an elongated casing or housing of appropriate size to be held by the user in one hand, although certain features are useful also in apparatus of larger size. One feature of the present invention resides in a simplification of the switching control mechanism which determines the kind of operation which is to be performed, such as a recording operation, a reproducing or listening operation to listen to sounds previously recorded, or a rewind operation to wind the tape on which sounds have been recorded on to the initial supply spool. Various forms of switching control are known in the art, many of which involve a plurality of switching members, expensive to build and assemble, and capable of faulty operation. According to one aspect of the present invention, all of the operative conditions of the apparatus are under the control of a single longitudinally movable member with an accessible finger piece so designed that it may be readily moved to any desired position by a single finger (preferably the thumb) of the hand which holds the apparatus. Preferably the accessible finger piece of the control slide is provided with a safeguard latch which must be moved in a lateral direction before the main control slide can be moved longitudinally to certain of its positions, thereby preventing or at least minimizing the risk of accidental undesired movements of the control slide.

Another feature of the invention relates to the drive of the tape reels. It is customary in tape recorders to provide for a rapid rewind of the tape from the take-up spool back on to the supply spool. It is also customary in tape recorders of large size to provide mechanism for a rapid forward or advance winding, to enable the user to skip part of the recorded sound and arive quickly at a later portion to which he wishes to listen, or a blank portion on which he wishes to resume recording. This rapid advance has not been customary, however, in small recorders of a suitable size to be held in one hand, because of space limitations. One of the features of the present invention is the provision of mechanism for rapid advance winding of the tape, notwithstanding the very small size of the apparatus. In the preferred form of construction, both the rapid advance and the rapid rewind are accomplished through toothed gearing, which creates some noise (at a tolerable level, however) whereas the slow advance during recording and the slow advance during playback or listening are accomplished through a friction drive which is silent and does not create the gearing noise which would be intolerable during recording or listening.

DESCRIPTION OF THE PREFERRED EMBODIMENTS

Figure 10:
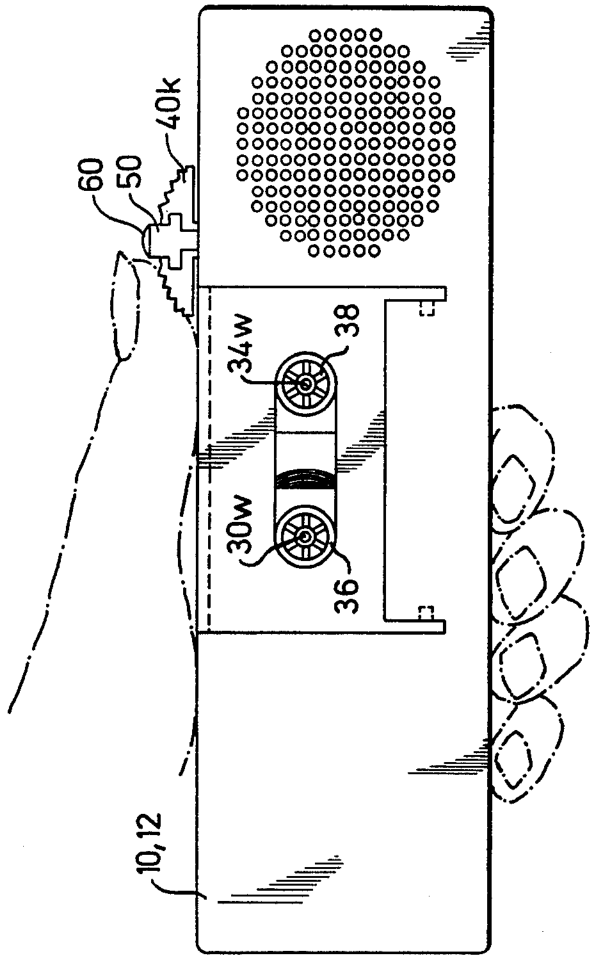
FIG. 10 is a side elevation of apparatus according to one embodiment of the invention, drawn approximately full size and showing how it may be held in one hand of the user in such position that all control movements may be operated by one finger.

In the preferred construction according to the present invention, the sound recording and reproducing apparatus comprises a multi-part longitudinally extending casing of rectangular cross-section so that it can be held and operated in one hand, in the manner illustrated in FIG. 10. A magnetic tape for sound recording and reproducing is incorporated in an exchangeable cassette of conventional form, having two spools which are coupled with associated drive elements inside the apparatus when the cassette is inserted into the apparatus. The drive is reversible so that the magnetic tape can be wound onto and unwound from the respective spools in known fashion.

Figures 1, 2, 3, 4:
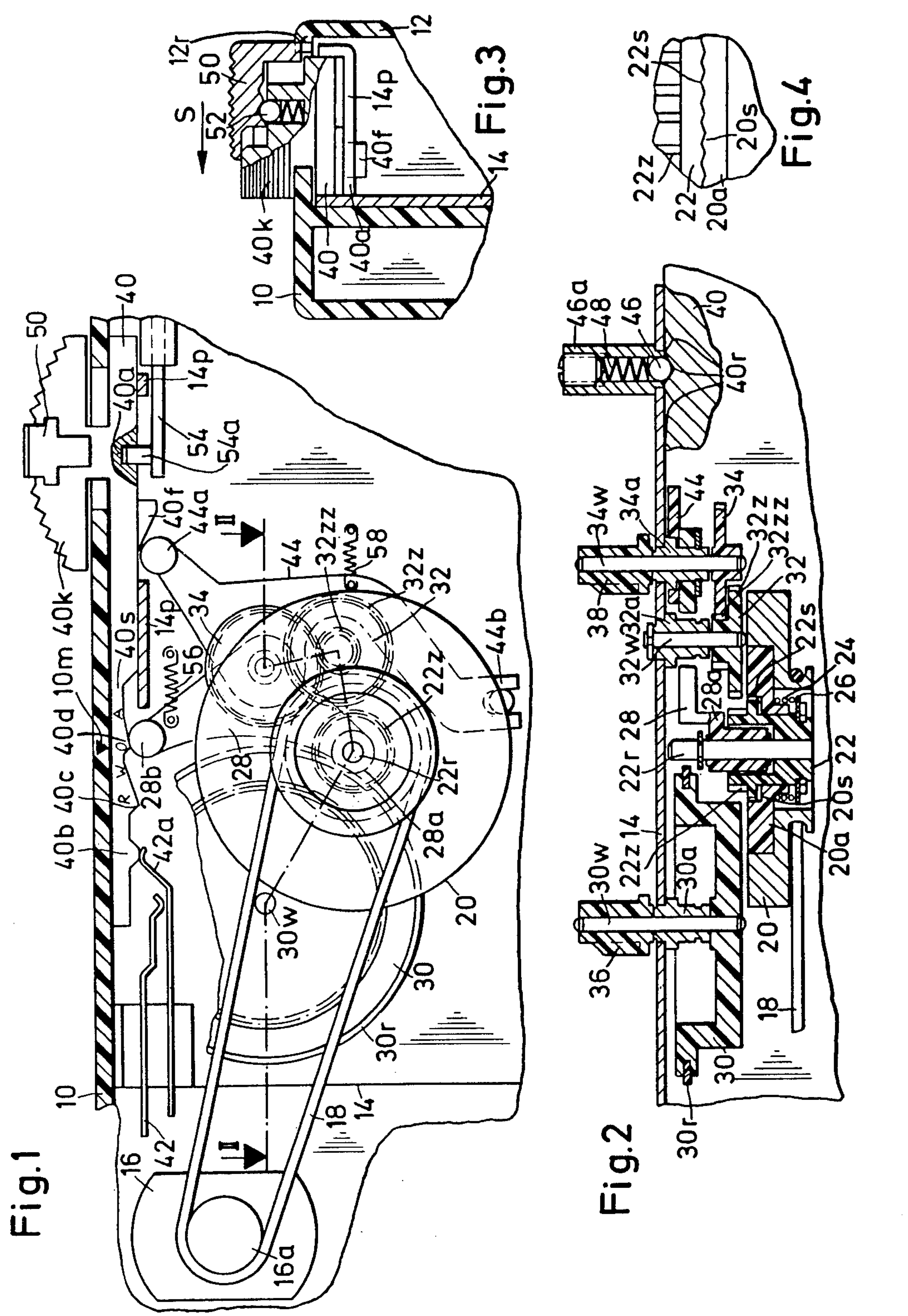
FIG. 1 is a longitudinal section through one form of apparatus according to the present invention, on an enlarged scale.
FIG. 2 is a section through the running gear, taken approximately on the section line II——II of FIG. 1.
FIG. 3 is a fragmentary section illustrating certain details of the changeover actuating member or switching control member.
FIG. 4 is a fragmentary view illustrating details of certain parts of the drive mechanism.

In FIG. 1, the casing is indicated at 10, and a removable cover at 12. These parts are made, for example, from plastic material and are held together by suitable fasteners such as screws, not illustrated. A base plate 14 is held by screws in fixed position inside the casing. The drive elements for the spools are arranged on this base plate.

An electric motor 16 is suitably mounted within the casing. The motor is usually powered by conventional batteries, not shown. On the armature shaft of the motor is a drive pulley **16*a* which, by means of an endless belt 18, drives a pulley formed as part of a flywheel 20. Inserted in the flywheel is a disk 20*a*, conveniently of molded plastic material and having a tight press fit in a recess in the flywheel 20**, so that these two parts rotate together. The flywheel is conveniently of metal having a thick heavy rim portion so as to have the mass which is desirable in a flywheel for smoothing out any possible irregularities in the rotation.

The inserted disk **20*a* has an internal radial shoulder 20*s* which is of saw toothed shape in a circumferential direction, as illustrated in FIG. 4. This saw toothed face mates with a corresponding saw toothed face 22*s* of an intermediate wheel 22 in the form of a sleeve freely rotatable about the central axis of the flywheel 20. A coil spring 24 surrounding the central axis presses upwardly against the lower side of the disk 20***a* and downwardly against an annular spring plate 26 mounted on the lower end of the sleeve 22, thus tending always to maintain the saw teeth 22*s* on the sleeve engaged with the saw teeth 20*s* on the inserted disk 20*a*, to establish a driving connection between the flywheel 20 and disk 20*a* on one hand, and the sleeve 22 on the other hand. However, this is a separable or yieldable connection. If the resistance to rotation of the sleeve 22 is so great that the sleeve cannot continue to turn, the slope of the teeth is such that the flywheel 20 and disk 20*a* can nevertheless continue to turn, the teeth 20s ratcheting over the teeth 22*s* because the spring 24 compresses slightly and allows one set of teeth to slip over the other set. A coaxial pin 22*r* is firmly mounted, as by means of a tight press fit, in the sleeve 22, and is rotatably received in the mounting eye 28*a* near the end of one arm of a switching or changeover lever 28 which will be further described below.

Three mounting bushings 30*a*, 32*a*, and 34*a* are fixed in the base plate 14 and serve as journals or bearings for three rotary shafts 30*w*, 32*w*, and 34*w*, respectively. To these shafts there are fixed, respectively, a forward driving wheel 30, a stepped toothed pinion 32, and a rewind driving gear or pinion 34. Also fixed to the shaft 30*w*, to turn therewith, is the drive member or drive hub 36 for the forward spool (not illustrated) of the tape cassette, while the drive member or drive hub 38 for the rewind spool (also not illustrated) of the cassette is fixed to the shaft 34*w* to turn therewith. On the periphery of the forward drive wheel 30 is a high friction circumferential band 30*r* such as a band of rubber, or a high friction rubber-like plastic material.

The changeover control member is in the form of a slide member 40 guided on a number of lateral projections 14*p* of the base plate 14, in such a manner that an actuating portion 40*k* projects out through a slot between the casing or housing 10 and the cover 12 to a position manually accessible to be moved by the finger of the user. On the portion of the member 40 within the housing there are several actuating cams shown in FIG. 1 at 40*b*, 40*c*, 40*d*, and 40*f*. The cam portion 40*b* cooperates with a movable contact spring 42*a* of a switch 42 which switches on or off the power source, such as a battery, in the electrical supply to the apparatus. The actuating cams 40*c* and 40*d* cooperate with the end 28*b* of the second arm of the two-armed switching lever or changeover lever 28 already briefly mentioned above. The end of the first arm of the lever 28 has an eye which forms a bearing or journal for the pin 22*r* as already mentioned above. Near its mid-point the lever 28 is journaled on the bushing 34*a* to swing thereon, and the end 28*b* of the second arm of this lever cooperates wtih the cams, as just mentioned. Finally, the actuating cam 40*f* on the member 40 cooperates with the end 44*a* of a control lever 44 which is rotatably mounted near its center on the same bushing 34*a* on which the sitching lever 28 is mounted. This control lever 44 has a second end 44*b* which, through suitable connections, moves an erasure head into and out of its operative position relative to the tape. Both the erasure head and the recording head may be of any convenient known form, well understood in the art, and are not illustrated.

The various switching positions of the changeover control member or slide 40 are indicated by a scale and a cooperating index mark visible on the outside of the housing. For the sake of simplicity of the drawing, FIG. 1 illustrates the scale at 40*s* inside the housing, cooperating with the index mark 10*m*. As shown, there is an intermediate position on the scale marked "0" and when this is brought opposite the index mark, the apparatus is turned off. Other markings on the scale, which can respectively be brought opposite the index, are "A" for recording, "W" for replaying (listening to what is already recorded), and "R" for rewinding. The slide 40 is frictionally held in any desired one of the positions W, O, and A by a suitable detent such as a ball 46 mounted in a sleeve 46*a* and pressed by a light spring 48 into one or another of the notches 40*r*. Such a notch may also be provided, if desired, for the rewind position R, but usually it is preferred not to provide a detent for this position, so that the control slide 40 can be more easily and more quickly moved away from the rewind position.

Preferably there is also a latch or lock for holding the slide 40 against accidental displacement from the "O" or "off" position. As seen in FIG. 3, this lock comprises a locking slide 50 mounted on the accessible handle portion 40k of the slide 40 and movable in a direction transverse to the direction of movement of the slide 40. In the O position of the slide 40, but not in other positions thereof, a lug on the slide 50 may be moved into a detent notch 12*r* on the cover portion 12 of the casing, thereby preventing longitudinal movement of the slide 40. A spring pressed detent ball 52 tends to hold the locking slide 50 in this position. When the locking slide 50 is moved in the direction of the arrow S with sufficient force to overcome the resistance of the detent 52, it is released from the notch 12*r* and the control slide 40 is then free to be moved longitudinally to one or another of its operating positions. The ball 52 seats in a second notch on the locking slide 50 to hold it in the unlocked position.

It should be noted that the slide 40 is coupled to a switching member 54 of an electronic amplifier for the magnetic tape apparatus, by conventional dogs such as pin-slit dogs (not illustrated) in such manner that this switching member 54 is positively carried along upon movement of the slide 40 to the A position or the W position. In this way the amplifier is brought into the operating position associated with the selected setting.

The operation of the apparatus is as follows: In FIGS. 1 and 2 the apparatus is shown in its "off" position O. Neither the flywheel 20 nor the intermediate wheel 22 is coupled to a driving wheel. The electrical switch 42, 42*a* is open, so that the electrical supply is switched off.

If now a recording is to be made, the control slide 40 must be moved leftwardly to the position A, the locking slide 50 first being released if it is engaged in the locking notch 12*r*. The leftward movement of the control slide 40 from position O to position A causes the actuating cam 40*b* to free the contact spring 42*a* so that it comes into contact with the other switch member 42, closing the electrical switch and activating the electrical parts of the apparatus. The switch member 54 is carried along by this setting movement of the control slide 40, and the amplifier circuit is thus brought to the "record" operating position.

Moreover, the actuating cam 40d frees the end 28*a* of the switching lever 28, so that the spring 56 turns the switching lever 28 clockwise on its fulcrum (the bushing 34*a* ) until the pin 22*r* of the flywheel 20 comes into frictional engagement with the frictional coating 30*r* extending circumferentially around the forward driving wheel 30. The necessary tight frictional engagement between the pin 22 and the forward driving wheel 30 is assisted by the pull of the resilient or elastic belt 18. The motor 16 is now running, because of the closing of the switch 42, 42*a*, thus driving the flywheel 20 and with it, the parts 20*a*, 22, and 22*r* in the same rotational direction. By virtue of the frictional engagement of the elements 22*r* and 30*r*, the driving wheel 30 and the associated tape spool mounted on the hub 36 are driven in the forward direction, so that the tape is moved slowly in the forward or recording direction. By means of the conventional recording head (not shown) the sound recording is applied to the magnetic tape in the well known manner.

Moreover, the movement of the control slide 40 from the O position to the A position has caused the cam 40*f* to move the control lever 44 in a clockwise direction on its fulcrum (the same bushing 34*a* on which the lever 28 is fulcrumed) against the force of the biasing spring 58, thereby bringing the erasing head into operation so that any previous old sound recording on the tape is erased in advance of the fresh recording.

The sound recording is interrupted or ended when the user returns the changeover slide or control slide 40 to the O position. The various movable parts of the apparatus then return to their normal rest positions shown in FIGS. 1 and 2.

Before the tape can be played to reproduce the sound recorded thereon, it must be rapidly rewound from one spool to the other. The rapid rewind of the tape occurs when the changeover slide 40 is moved to its extreme right hand position to bring the R indication of the scale opposite the index mark, and the slide is to be held in this position by the user. In this position, the actuating cam 40*b* comes out of engagement with the switch spring 42*a* so that the switch closes and the driving motor 16 is switched on. The cam 40c of the slide 40 engages the end 28*b* of the switching lever 28 and turns the lever counterclockwise so that the flywheel 20 and the intermediate wheel 22 are displaced in a direction away from the forward driving wheel 30, and the gear teeth 22*z* of the intermediate wheel 22 are brought into meshing engagement with the teeth 32*z* of the pinion 32. The other teeth 32*zz* of the pinion 32, meshing with the teeth of the rewinding gear wheel 34, serve to drive this gear wheel at high speed in the reverse direction, thereby driving reversely the hub 38 on which the rewinding spool of the tape cassette is mounted, to rewind the tape rapidly onto this spool.

At the end of the rewinding operation, the changeover slide 40 is moved slightly leftwardly to the W position, if the recording on this tape is now to be reproduced or played. This movement of the slide 40 brings the switch 54 into the proper position for activating the amplifier for replay. Moreover, the end 28*b* of the switching lever 28 is freed from both of the actuating cams 40*d* and 40*c*, so that the biasing spring 56 turns the switching lever 28 in a clockwise direction and produces the frictional engagement between the driving pin 22*r* and the forward driving wheel 30, 30*r* as previously explained. The tape is moved slowly past the replaying head in the forward direction, so that the recorded sound is played. During the replay, the control lever 44 is held by a spring 58 in the inoperative position illustrated, so that the erasing head is inoperative.

It should be noted that when the end of the tape is reached during a winding operating, the drive hubs 36 and 38 and the spool drive wheels connected thereto remain stationary. However, as the drive motor 16 continues to run, there is danger of tape breakage or damage to the parts. This danger is avoided in the present construction, in that when the intermediate wheel 22 is stationary (as a result of blocking of the members 36 and 38) while the flywheel 20 and insert 20*a* continue to be driven by the motor 16, the releasable connection provided by the saw tooth form of the teeth 20*s* 22*s* comes into play so that the parts 20 and 20*a* can continue to rotate, displacing the parts 20*a* and 22 away from each other to a slight extent in an axial direction, against the force of the spring 24. The parts thus consitute a ratcheting slip clutch. The slipping of the teeth past each other produces a ratcheting noise which is quite audible, and constitutes a signal which makes the user aware that the end position of the tape has been reached, informing him that the drive motor should be switched off and that the tape travel is to be reversed according to the appropriate setting of the apparatus. This releasing ratcheting friction drive is a valuable feature when reaching the end of the tape in either direction, but is particularly valuable and important when the end is reached during a rewinding operation.

It will be clear from the foregoing explanation of the preferred embodiment of the invention that the driving mechanism is so arranged that friction wheels are used only for the forward movement of the magnetic tape, when an absolutely quiet drive is required. During the rewinding of the tape, however, when no sound is being either recorded on the tape or reproduced from the tape, the drive is by way of gear wheels, the attenuated or dampened operational noise of which during this phase has no damaging effect and therefore can be tolerated. During the rewinding using gear wheel transmission, less driving force is needed than with a friction drive, so that the batteries supplying the motor are conserved, and longer operation with one set of batteries can be achieved. Moreover, the drive elements are so arranged that the frictional engagement between the friction wheel 22*r* of the driving member 20 and the tape drive wheel 30, 30*r* is assisted by the traction effect of the drive motor on the belt 18. As above explained, this belt is elastic or resilient, and tends to pull the flywheel 20 and associated parts in a direction toward the drive wheel 30. The belt must be slightly stretched or elongated in order to move the flywheel 20 and switching lever 28 to the neutral or O position, and must be still further stretched or elongated to move these parts to the reverse driving position with the gear teeth 22*z* engaged with the gear teeth 32*z*, but the action of the cam 40*c* on the switching lever 28 is powerful enough to accomplish the necessary slight stretching of the belt for rewinding operation. Also it is noted that the spring 56 assists in holding the friction drive wheel 22*r* against the forward drive wheel 30 during a forward driving operation. In other words, the elasticity of the belt 18 and the action of the spring 56 complement each other in maintaining the necessary tight pressure during forward driving.

It will be clear from the foregoing explanation of this embodiment of the invention that the switching slide or control member 40 is arranged in the housing in such a way that the user can hold the entire apparatus conveniently in one hand, and operate the control member easily and quickly by one finger (preferably the thumb) of the hand which holds the recorder, in the manner illustrated in FIG. 10. As a consequence of the direct engagement between the switching or control slide 40 and the interior operating elements such as the parts 28*b* and 44*a*, a compact easily controllable and economic operating arrangement is achieved. The coordination and interaction of the various parts promotes positive control of the drive mechanism in a reliable and efficient manner, minimizing or eliminating any chance of failure in the operation of the switching or control system. Also, the construction of the switching or control slide 40 in one piece or part enables it to be produced economically and advantageously as a mass production article, suitable for manufacture by injection molding of plastic material, reducing both the cost of manufacture and the cost of assembly as compared with many of the prior art tape recorders where separate slides or buttons are required for controlling the respective operations of recording, rewind, or playback.

Figures 5, 6, 7:
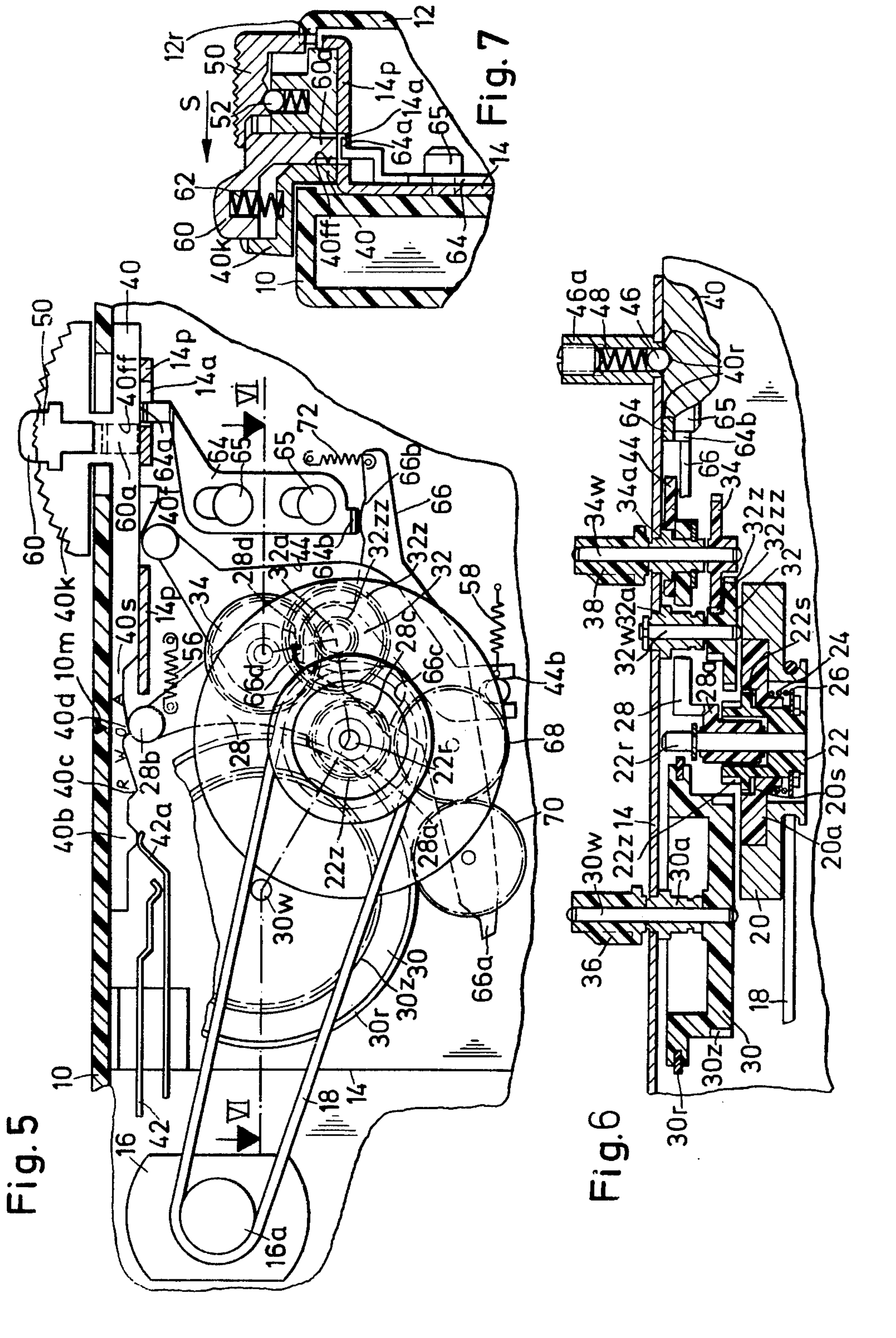
FIG. 5 is a view similar to FIG. 1, illustrating another embodiment of the invention.
FIG. 6 is a section through the running gear, taken approximately on the section line VI——VI of FIG. 5.
FIG. 7 is a view similar to FIG. 3, illustrating certain components of the form of the invention shown in FIGS. 5 and 6.

A second embodiment of the invention is illustrated in FIGS. 5–7, to which reference is now made. This second embodiment is similar in general to the embodiment first described, and corresponding parts are indicated by the same reference numerals used in the first embodiment, so that separate description of such corresponding parts is not needed. The main difference between the second embodiment and the first embodiment is that the second embodiment has provision for fast advance or rapid transport of the tape from the supply reel to the take-up reel, which is very advantageous when the user wishes to skip part of what has been recorded and proceed directly to listen to a recording farther along on the tape, or to proceed quickly to the end of a previous recording and make a new recording on the unused remainder of the tape. As already indicated, fast advance mechanism has been commonly used in the art in large tape recorders, but in the past the fast advance mechanism has not been of such simple and compact design that it could be used in a very small tape recorder suitable for holding in one hand and for control by one finger of that hand.

In this second embodiment, a presser or button 60 is mounted in the actuating head or finger piece 40*k* of the control slide 40, in such manner that it can be pressed by the operator's finger in a direction transversely to the longitudinal operating direction of the slide 40, against the influence of a return spring or bias spring 62, seen in FIG. 7. A projection 60*a* on this presser 60 is guided in a guide portion or component 40*ff* of the slide 40, and in the rest position of the presser, this projection is disposed directly above the tab or lug 14*p* of the base plate 14, as seen in FIGS. 5 and 7. An opening 14*a* in this lug 14*p* is so placed that the projection 60a is disposed directly above the opening 14*a* only when the slide 40 is in the W position (play-back or listening position) of the slide 40.

An intermediate member 64, in the form of a slide mounted on and guide by headed studs 65 on the base plate 14, has an upper end 64*a* extending into the opening 14*a* of the lug 14*p*, as seen in FIGS. 5 and 7. The lower end 64*b* of the intermediate slide 64 overlies and cooperates with a projection 66*b* on a carrying lever 66 which is pivotally mounted on the fixed bushing 32*a* and which lies in the same plane as the main portion of the switching lever or change-over lever 28 mounted on the bushing 34*a*. Two toothed gear wheels 68 and 70, constantly meshing with each other, are rotatably mounted on the arm 66*a* of the carrying lever 66. These gears 68 and 70 lie in the same plane as the pinion 22*z* and the same plane as circumferential gear teeth 30*z* extending around the periphery of the drive wheel 30 which drives the take-up tape reel. These gears 68 and 70 serve for fast advance of the tape from the supply reel onto the take-up reel.

The carrying lever 66 also includes an abutment projection 66*c* which cooperates with an abutment 28*c* on the switching lever or change-over lever 28, and a projection 66d which interacts with a projection 28*d* on the lever 28. A biasing spring 72 tends to turn the carrying lever 66 in a counterclockwise direction on the bushing 32*a*, thus tending to keep the gear 68 out of meshing contact with the pinion 22*z* and the gear 70 out of meshing contact with the gear teeth 30*z*.

The apparatus according to this embodiment of the invention operates exactly the same way as the apparatus according to the first embodiment, so far as the drive positions A or W or R are concerned; that is, when recording, when playing back to listen to a previous recording, when using the fast rewind to rewind the tape back from the take-up spool to the supply spool. But when the user desires fast advance or rapid forward motion of the tape from the supply spool onto the take-up spool, he moves the slide 40 to the W or listening position, and then presses downwardly on the button or presser portion 60 of the control finger piece. This can be easily done by finger pressure, preferably using the thumb of the hand which is holding the apparatus.

The downward motion of the button 60 causes the arm 60*a* thereof to enter into the opening 14*a* in the stationary flange 14*p*, pressing downwardly on the upper end of the intermediate slide or lever 64, so that the lower end of the member 64 presses downwardly on the arm 66*b* of the carrying lever 66, turning this lever slightly in a clockwise direction on the bushing 32*a* on which it is mounted. In the first phase of this clockwise movement of the carrying lever 66, the projection 66d on the lever engages the portion 28*d* of the switching or change-over lever 28 and turns the lever 28 slightly in a clockwise direction, to move the friction driving element 22*r* away from the periphery of the drive wheel 30 of the take-up spool. This serves to disconnect the slow speed frictional drive of the take-up spool. A slight further clockwise movement of the carrying lever 66 brings the gear wheel 68 into engagement with the teeth of the pinion 22*z* and simultaneously brings the gear wheel 70 into meshing engagement with the gear teeth 30*z* of the drive wheel 30. This establishes the fast forward drive or rapid advance, turning the drive wheel 30 of the take-up spool much faster than when it is driven by the friction drive element 22*r*, during normal slow speed recording or listening. The final limit position or end position of the carrying lever 66 is determined by engagement of the abutment projection 66*c* of the lever 66 with the abutment portion 28c of the switching lever 28.

As soon as the downward finger pressure on the control element 60 is released, the elements 60, 64, and 66 return to their normal rest positions under the influence of the springs 62 and 72, thus disconnecting the fast forward drive and reestablishing the slow frictional forward drive automatically. The slow forward drive continues to operate and the reproducing apparatus continues to reproduce the sound already on the tape, as long as the finger piece 40$k$ is left in the W or playback position.

While the fast advance drive is operating, through elements 18, 20, 22$z$, 68, 70, and 30$z$, the speed of travel of the tape is approximately five times as great as when the normal forward drive is operating through elements 18, 20, 22, 22$r$, and 30$r$. Hence the replay tone is distorted during the rapid movement of the tape, but this is not disadvantageous, as the rapid winding serves only for finding a required position on the tape, after which the required recording can be heard at the normal speed of the tape.

It will be appreciated from the preceeding explanation of the embodiment illustrated in FIGS. 5–7, that the switching slide or control slide 40 and the control member 60 for the rapid advance, are arranged in the housing in such a way that the user can hold the tape apparatus in one hand and control various operating positions all with one finger (preferably the thumb) of the same hand which holds the apparatus. As a result of this advantageous arrangement of the control elements, a compact, easily and quickly operable arrangement is achieved, in a form which can be manufactured economically. The arrangement of the stop and catch or latch devices for the slide 40 and the special control member 60, results in a reliable control of the apparatus.

Figure 9:
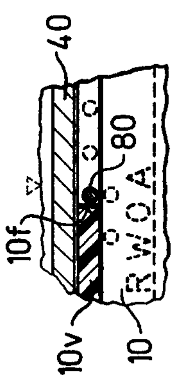
FIG. 9 is a section taken approximately on the line IX--IX of FIG. 8.
Figure 8:
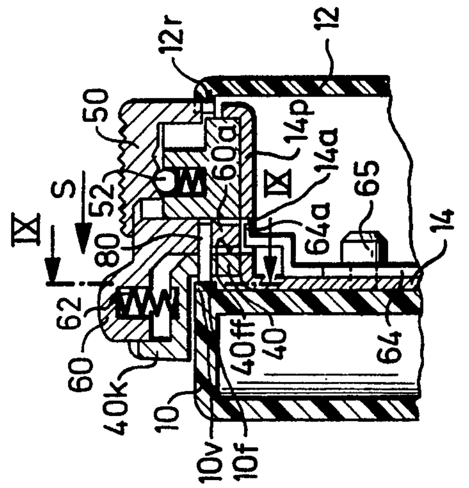
FIG. 8 is a view similar to FIG. 7, showing a further embodiment.

A further development of latching mechanism to prevent accidental undesired operation, is illustrated in FIGS. 8 and 9, which show a latch associated with the control slide 40 which allows the control slide to be moved to the recording or A position only on purposeful operation of the presser or button 60. When the apparatus has been used with the control slide in th R or W position and when the slide is moved back to the disconnected or off position O the control slide may sometimes be moved too far, bringing it accidentally to the recording position A and unintentionally making an undesired recording.

This is prevented by the further latch comprising a latch pin 80 (FIGS. 9 and 10) carried by the presser or button 60 and arranged in horizontal alignment with an abutment surface 10f at one end of a projection 10v formed on the casing or housing part 10 which faces the control slide 40. When the control slide is in the rest or off position O and the button 60 is in its normal elevated position (held upwardly by the spring 62) the latch pin 80 lies against or close to the abutment 10$f$, as seen in full lines in FIG. 9, thereby preventing the control slide 40 from being moved leftwardly to the A or recording position. On the other hand, the control slide 40 can freely move rightwardly to bring it to the W position or the R position.

However, if the user wishes to switch to the recording or A position, he must first depress the button or presser 60 (in addition to releasing the latch 50 if this has been engaged with the notch 12$r$) sufficiently far to move the latch pin 80 downwardly to a position below the abutment 10$f$. *Only then can the slide 40 be moved further leftwardly to the recording position. The latch pin 80 rides along the bottom edge of the projecting ledge 10v* and the button 60 is thereby held in its depressed position so long as the control slide remains in the A position. When the slide 40 returns from the A position to the O position, the latch pin 80 passes beyond the right end of the ledge 10$v$ and the presser or button 60 will be automatically returned upwardly to its normal rest position by action of its spring 62.

Preferably the parts are so portioned that an initial slight downward movement of the button 60 is sufficient to move the latch pin 80 down far enough to clear the abutment 10$f$. A greater or further downward movement of the button 60 is necessary if one wishes to engage the foot 60a of the button with the upper end 64$a$ of the slide 64, to activate the rapid advance drive of the tape. As already explained, this rapid advance actuation can take place only when the control slide is in the listening or W position, and this is the position in which the foot 60$a$ of the button 60 is aligned with the opening 14$a$ of the flange 14$p$ and with the end of the slide 64. But in the O position of the slide, the button 60 can be depressed far enough to release the latch pin 80 from the abutment 10$f$, although the stationary flange 14$p$ prevents it from being depressed to the same extent as would be necessary for actuating the rapid advance mechanism.

Referring to FIG. 10, the batteries for powering the drive motor and the electric circuits for recording and reproducing the sound are located preferably in the left hand portion of the housing or casing; the speaker and the amplifier and the related circuit components are located preferably in the right hand portion of the housing; and the recording and playback head and the erasing head are located in the central portion of the housing. All of these elements just mentioned are conventional and well known in the art, so are not illustrated.

Words indicating directions such as up, down, rightwardly, or leftwardly have been used merely as a convenience in describing what is shown in the drawings. Such words are not intended as limitations, since the apparatus may be oriented in any desired direction. What is described as a downward or rightward movement may in fact be an upward or leftward movement in the actual apparatus, depending on how it is held or oriented.

The embodiments of the invention in which an exclusive property or privilege is claimed are defined as follows:

1. Tape recording and reproducing apparatus comprising reversible drive means for causing forward movement and rewinding movement of a recording tape, and an elongated housing adapted to be held in one hand of a user, said drive means being in said housing, characterized by a single control slide mounted for longitudinal movement in the direction of elongation of said housing to a plurality of different operating positions respectively controlling different kinds of operation of the apparatus, said control slide having means within the housing for controlling operation of said drive means and other parts of said apparatus, said control slide also having an actuating portion projecting out to a manually accessible position outside of said housing, one of said different operating positions of said control slide being a rest position in which said apparatus is turned off, said apparatus further including releasable latch means for latching said control slide in said rest position.

2. Apparatus as defined in claim 1, further including a plurality of actuating cams within said housing and associated with said control slide, said cams respectively serving, in accordance with the position of said control slide, to actuate an electric supply switch (42, 42*a*), a drive reversing lever (28), and a control lever (44) for an erasing head.

3. Apparatus as defined in claim 1, wherein said control slide is associated with a bore (40*a*) cooperating with a pin (54*a*) on a control member (54) for controlling operation of an electronic amplifier.

4. Apparatus as defined in claim 1, in which said control slide is a singel part of molded plastic material.

5. Apparatus as defined in claim 1, wherein said releasable latch means moves between latching and unlatching positions in a direction transverse to the direction of movement of said control slide.

6. Apparatus as defined in claim 5, wherein said control slide has a manually accessible operating knob accessible externally of said housing, and wherein said releasable latch means is mounted in said knob in a position to be operated by the same finger of an operator which actuates said knob.

7. Apparatus as defined in claim 5, further comprising spring detent means (52) tending to hold said releasable latch means in its latching position.

8. Tape recording and reproducing apparatus comprising reversible drive means for causing forward movement and rewinding movement of a recording tape, and an elongated housing adapted to be held in one hand of a user, said drive means being in said housing, characterized by a single control slide mounted for longitudinal movement in the direction of elongation of said housing to a plurality of different operating positions respectively controlling different kinds of operation of the apparatus, said control slide having means within the housing for controlling operation of said drive means and other parts of said apparatus, said control slide also having an actuating portion projecting out to a manually accessible position outside of said housing, said control slide being shiftable from a rest position to various positions for recording, for rewind, and for replaying a recorded sound at normal speed, further including a special operating member (60) for causing rapid winding in a replaying direction, said actuating portion of said control slide and said special operating member both lying in a position where they are operable by the same finger of one hand in which the apparatus is held.

9. Apparatus as defined in claim 8, wherein said special operating member is mounted on and moves bodily with said control slide, further including blocking means (14*p*, 60*a*) permitting full effective movement of said special operating member only when said control slide is in replaying position.

10. Apparatus as defined in claim 9, wherein said special operating member (60) is movable against spring pressure in a direction transverse to the direction of longitudinal movement of said control slide (40).

11. Apparatus as defined in claim 9, wherein said blocking means is formed by a fixed wall (14*p*) having an opening (14*a*) into which a portion (60*a*) of said special operating member (60) may enter only when said control slide (40) is in its replay position, entrance of said portion (60*a*) into said opening serving to shift a carrying lever (66) to a position establishing rapid drive in a replay direction.

12. Apparatus as defined in claim 11, wherein entrance of said portion (60a) into said opening (14*a*) serves also to prevent movement of said control slide (40) away from its replay position.

13. Apparatus as defined in claim 8, further including a pair of transmission gear wheels (68, 70), and a carrying lever (66) on which said gear wheels are mounted, actuation of said special operating member (60) serving to move said carrying lever to shift said transmission gear wheels to operative positions effective to increase the speed of winding in a replay direction.

14. Apparatus as defined in claim 8, further including releasable latch means for preventing movement of said control slide from another position to recording position, said latch means being released by predetermined movement of said special operating member.

15. Apparatus as defined in claim 14, wherein said releasable latch means comprises a fixed abutment surface (10*f*) and a cooperating pin (80) on the special operating member (60), said pin cooperating with said abutment surface when said special operating member is in a rest position and being moved out of cooperative relation to said abutment surface when said special operating member is moved to a predetermined extent from its said rest position.

16. A reversible drive for a tape recorder or the like, comprising a forward drive means including a drive wheel having a friction surface, reverse drive means including a reverse wheel having gear teeth, a shiftable assembly including a flywheel, a friction wheel, and a toothed gear wheel coupled to each other to rotate together, a driving motor for driving said assembly, and control means for shifting said assembly selectively between a forward driving position in which said friction wheel of said assembly is in friction driving engagement with the friction surface of said drive wheel and a reverse driving position in which said toothed gear wheel of said assembly is in meshing engagement with said reverse wheel and a disengaged position in which said assembly is disengaged from both said drive wheel and said reverse wheel, said friction wheel of said shiftable assembly being on one side of said drive wheel and said drive motor being on the opposite side of said drive wheel, and an elastic driving belt operatively connecting said motor to said shiftable assembly, said elastic driving belt being so positioned that the tractive effect of the belt tends to draw the friction wheel of said assembly into firmer engagement with the friction surface of said drive wheel.

17. A drive as defined in claim 16, wherein said shiftable assembly is mounted on and moves bodily with one arm of a switching lever, said lever having a second arm engaged by said control means to shift said assembly.

18. A drive as defined in claim 17, further including spring means acting on said lever and biasing it in a direction to tend to keep said shiftable assembly in forward driving position.

19. A drive as defined in claim 16, wherein said forward drive wheel is fixed to a shaft and wherein a forward hub for engaging and driving a forward-motion tape spool is also fixed to said shaft.

20. A drive as defined in claim 16, further including a rewind hub for engaging and driving a rewind tape spool, a rewind shaft fixed to said rewind hub, and a rewind gear fixed to said rewind shaft, said rewind gear meshing with said reverse wheel.

21. A drive as defined in claim 16, wherein said control means includes a manually adjustable sliding member having a plurality of cam portions thereon for respectively determining a plurality of positions of said shiftable assembly.

22. A drive as defined in claim 16, wherein said shiftable assembly is mounted on and moves bodily with a first arm of a switching lever having two arms, and wherein said control means includes a manually adjustable sliding member having a plurality of cam portions thereon for respectively engaging the second arm of said switching lever to determine a plurality of respective positions of said shiftable assembly, further including spring means acting on said switch lever and biasing it in a direction to tend to keep said shiftable assembly in a forward driving position.

* * * * *